United States Patent
Vanderslice

[15] 3,668,420
[45] June 6, 1972

[54] 1.5 MICRON RAMAN LASER
[72] Inventor: James T. Vanderslice, Rockville, Md.
[73] Assignee: International Business Machines Corporation, Armonk, N.Y.
[22] Filed: Sept. 25, 1970
[21] Appl. No.: 75,466

[52] U.S. Cl. .......................... 307/88.3, 321/69 R, 331/107 R
[51] Int. Cl. .......................................................... H03f 7/00
[58] Field of Search ..................... 307/88.3; 321/69; 331/107

Primary Examiner—Roy Lake
Assistant Examiner—Darwin R. Hostetter
Attorney—Hanifin and Jancin and Thomas F. Galvin

[57] ABSTRACT

A laser system which emits Raman-stokes radiation in the 1.5 micron (eye-safe) region is achieved by directing a Q-switched 1.06 micron giant pulse beam through a Raman-active medium which has a Raman frequency shift of around 3000 cm$^{-1}$. The Q-switch is a saturable absorber dye from the class of bivalent transition metal dithiene complexes.

13 Claims, 5 Drawing Figures

PATENTED JUN 6 1972    3,668,420

INVENTOR
JAMES T. VANDERSLICE

BY *Thomas F. Galvin*

AGENT

1.5 MICRON RAMAN LASER

CROSS-REFERENCE TO A RELATED APPLICATION

This application is related to the application titled Q-Switching Saturable Absorber Dye for a Laser by K. A. Drexhage and U. T. Mueller-Westerhoff, filed Sept. 25, 1970, Ser. No. 75,601, and assigned to the same assignee as the present application. The Dreshage, et al. application describes a class of compounds useful as saturable absorber dyes. Certain compounds from this class are used as the saturable absorbers in the present application.

BACKGROUND OF THE INVENTION

1. Field of the Invention

This invention relates to the stimulation of Raman radiation by means of Q-switched giant laser pulses.

2. Description of the Prior Art

Considerable research has been undertaken to discover a coherent laser source in the eye-safe region which has sufficient power and brightness to be used, for example, in rangefinders and optical radar. However, up to the present time, laser rangefinders have not generally been permitted to operate under field conditions because of the danger to eyesight.

Laser wavelengths in the 1.35 to 2.2 micron region offer a promising approach to the eye safety problem in laser operations. At wavelengths below 1.35 microns, considerable retinal damage is inflicted on an eye which is exposed to the radiation. The radiation is focused on the retina by the eye lens, raising the power density at the retina around six orders of magnitude above that at the cornea and other exposed tissue. At wavelengths above 2.2 microns, significant thermal effects of the cornea of the eye begin to occur. Recent research indicates that the eye is least sensitive to radiation around 1.5 microns. See "Safer Wavelengths in the Near-Infrared," Thornton, *Laser Focus*, pp. 38–39, June 1969. However, research in this field has failed to produce an efficient laser source at these wavelengths.

Laser rangefinders currently in use, such as ruby lasers, emit radiation in the visible region. They present a severe eye hazard, even at ranges beyond a mile. In an effort to find suitable alternatives outside the visible spectrum, three possible laser systems have appeared most promising.

One possible system consists of a Q-switched erbium-glass laser with an output of 1.54 microns, an eye-safe wavelength. However, the efficiency, expressed as the ratio of output energy to the input electrical energy is low and the laser therefore requires a large power supply to operate it. This factor makes the erbium-glass laser unattractive for field use.

A second possible system consists of a parametric down-converter in which the output from a 1.06 micron source is converted to 1.5 microns when the source beam is passed through a suitable non-linear crystal. Under controlled conditions, very high conversion efficiencies may be possible. However, phase matching of the source beam with the down-converted beam is a serious problem due to its critical dependence on temperature changes. High efficiency, in turn, is critically dependent on phase matching. In addition, the homogeneity of the crystal material is critical but cannot be assured due to present state of the art limitations.

A third possible system would stimulate Raman radiation in the eye-safe region by directing a 1.06 micron Q-switched giant laser pulse through a Raman-active medium which has a frequency shift of around 3,000 cm$^{-1}$. The Raman laser, as this type of system is called, is an inherently efficient wavelength converter. In addition, the divergence of the output can be near the diffraction limit.

Up to the time of the present invention, successful stimulation of a Raman-active medium to emit high energy radiation of around 1.5 microns had not been achieved. In fact, it has been suggested that this system is the least feasible approach among the three possible alternatives outlined above. See, e.g., the publication in *Laser Focus* previously referred to.

To appreciate the problems faced in attempting to construct a 1.5 micron Raman laser, it will be helpful to explain the principal components of the system.

A Q-switched giant pulse laser ordinarily comprises a laser rod which is pumped by external pumping radiation. Lasing is suppressed during the pumping operation by the Q-switch until an extremely high population inversion is created. When the suppressing medium is eliminated, the laser system lases with enormous power, i.e., the system is "Q-switched." Moreover, it has been known for a number of years that a saturable dye which has an absorptive peak at the wavelength of the laser output can be used as a Q-switch. In operation, the dye prevents lasing action by absorbing the output until the dye is saturated. The dye then becomes transparent and lasing occurs in a single, giant pulse. For a theoretical analysis of Q-switching by means of a saturable absorber, see "Theory of Laser Giant Pulsing by a Saturable Absorber," A. Szabo and R. A. Stein, *Journal of Applied Physics*, Vol. 36, No. 5, May 1965, pp. 1562–1566 or the related copending application of Drexhage, et al. referred to previously.

A Raman medium is one which tends to convert a primary beam into radiation at other frequencies which are displaced from the primary beam frequency by the "Raman frequencies" of the medium. These shifted frequencies typically are displaced by 200 to 4,000 per cm$^{-1}$ higher and lower than the primary beam frequency. The lower frequencies are termed Stokes lines; the higher frequencies are termed anti-Stokes lines. By far the greatest amount of radiation is usually observed in the Stokes lines.

By providing sufficient optical feedback for radiation at the shifted frequencies, coherent buildup will occur at these frequencies. The energy required is provided by the primary beam. The primary beam is usually supplied by a giant pulse laser because of the high energy needed to stimulate the Raman scattered radiation.

Neodymium-doped glass (Nd$^{+3}$-glass) and neodymium-doped yttrium-aluminum-garnet (Nd-YAG) will radiate coherent energy at a wavelength of 1.06 microns when pumped by a suitable source. Methane (CH$_4$) and deuterium (D$_2$) are known to have a Raman frequency shift of around 3,000 cm$^{-1}$. For Nd$^{+3}$-glass and D$_2$, it can be calculated that a stimulated Raman-Stokes emission might occur at 1.5 microns according to the relationship:

$$\gamma_p - \gamma_{shift} = \gamma_{stokes} \qquad (1)$$

where $\gamma_p$ is the reciprocal of the wavelength of the primary Nd$^{+3}$-glass beam, $\gamma_{shift}$ is the frequency shift of D$_2$ and $\gamma_{stokes}$ is the reciprocal of the wavelength of the Raman-Stokes emission. The emission would occur if the energy of the primary beam were sufficiently great to exceed the threshold condition of the resonant cavity in which the Raman medium is disposed.

The magnitude of energy required to achieve threshold is a function of many parameters. Threshold is reached when the losses within the Raman medium exceed the gain achieved from the energy in the primary beam. This condition is given by the equation:

$$V I_p L = 1 N R_1 R_2 \qquad (2)$$

where $V$ is a constant proportional to the spontaneous Raman cross-section, $I_p$ is the intensity of the primary beam field, $L$ is the length of the resonant cavity enclosing the Raman medium, and $R_1 R_2$ is the product of the reflectivities of the mirrors forming the cavity.

According to numerical calculations based on equation (2) above, it was expected that high intensity Stokes radiation at 1.5 microns could be achieved with relative ease. However, a number of experiments yielded no usable output. One such experiment included the use of D$_2$ as the Raman medium in an oscillator configuration or resonant cavity, Nd$^{+3}$-glass as the giant pulse laser rod, and a bleachable absorber dye, known commercially as Eastman 9740, as the Q-switch. The D$_2$ was replaced by methane, (CH$_4$), which has a Raman frequency shift of 2,916 cm$^{-1}$, and again no output was observed. In other experiments, the Q-switch was a Pockels cell rather than a bleachable absorber dye. As with the dye, however, neither $D_2$ nor $CH_4$ gave a noticeable output.

Due to the complete lack of success, it was decided to verify the experimental arrangement using another Raman medium which had been stimulated successfully in the past. Hydrogen ($H_2$) was therefore substituted for the $D_2$ or $CH_4$ with a Pockels cell as the Q-switch. Raman-Stokes emission was observed as expected (but at a wavelength not within the previously discussed eye-safe region). Because $H_2$ has a gain which is a factor of three higher than either $D_2$ or $CH_4$, it was thought that if more power were supplied from the giant pulse laser under the same experimental conditions, then stimulated emission from $D_2$ or $CH_4$ could be obtained. However, as the laser power from the giant pulse laser was increased, optically induced spark breakdown was observed and most of the energy of the pump laser was absorbed by an inverse bremsstrahlung process, yielding no stimulated Raman emission. It has been concluded that the primary beam from the Q-switched $Nd^{+3}$-glass rod, although powerful enough, was spectrally too broad to stimulate Raman emission.

SUMMARY OF THE INVENTION

Accordingly, it is a primary object of this invention to generate high-energy, high brightness laser radiation in the eye-safe region.

Another object of this invention is to stimulate high-energy Raman emission in the eye-safe region.

Another object of this invention is to produce laser radiation in the eye-safe region efficiently and reproducibly for long periods of use.

Another object of this invention is to generate eye-safe radiation from a compact source which requires low input power.

In accordance with these and other objects, the present invention yields efficient, high energy and reproducible Raman laser emission at 1.5 microns. The inventive system includes the use of a saturable absorber dye from the class of bivalent transition metal dithiene complexes to Q-switch a source of 1.06 microns to provide a giant pulse. The pulse stimulates Raman-stokes emission from a Raman medium having a frequency shift of around 3,000 $cm^{-1}$. In specific embodiments, either $Nd^{+3}$-glass or Nd-YAG may comprise the source of 1.06 microns; $CH_4$ or $D_2$ may comprise the Raman media; and bis-[4-dimethylamino-dithiobenzil]-nickel comprises the saturable absorber dye. A complete description of the dye and its properties is given in the above-referenced copending application of Drexhage, et al.

The apparent reason for achieving Raman radiation at 1.5 microns is the extremely narrow linewidth of the 1.06 micron giant pulse radiation when Q-switched by the particular dye compounds which are described in detail in the related application of Drexhage, et al. For example, prior to the present invention, the line-width from a Q-switched $Nd^{+3}$-glass rod was approximately 100 A. Results obtained using the present dye yield a linewidth of 1 A, i.e., the output from the $Nd^{+3}$-glass rod is 1.0641 microns.

BRIEF DESCRIPTION OF THE DRAWING

The invention will be more fully understood by referring to the following detailed description taken in connection with the accompanying drawings, forming a part thereof, in which:

Referring now to FIG. 1, a Q-switched giant pulse laser 1 is illustrated, the output of which is optically coupled to and stimulates radiation from Raman-active medium 2. The radiation from laser 1 is a pulse of very high power with a wavelength of 1.06 microns. This radiation stimulates Raman-active medium 2 to emit a pulse with a wavelength of 1.5 microns, which will not harm the eye. The wavelength of the Raman pulse differs from the wavelength of the input giant pulse by the Raman shift of medium 2.

FIG. 2 illustrates a compact system of the invention which is useful for continually producing 1.5-micron pulses over long periods and under varying environmental conditions. There is shown a Raman-active medium 10, contained in cell 11. Cell 11 is preferably fabricated of stainless steel. An optical resonant cavity is formed by cell 11 and concave reflecting surfaces 12 and 14 coated thereon. The concave configuration of the reflectors 12 and 14 enables them to act both as focusing and also recollimating lenses for the radiation. Bellows 15 allows adjustment of the length of cell 11.

Figure 1:
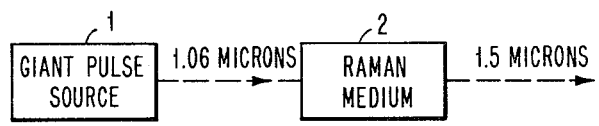
FIG. 1 exemplifies the basic system for generating a high-power, high brightness beam in the 1.5-micron region.

In the preferred embodiments, the Raman-active medium 10 is $CH_4$ maintained at pressures between 10 and 20 atm. in cell 11. It will be understood that any other gas having a Raman frequency shift of around 3,000 $cm^{-1}$ such as $D_2$ will also be effective. Reflector 12 is dichroic, being substantially 100 percent reflecting to 1.5 microns and transmitting radiation at 1.06 microns. Reflector 14 is dichroic and selected to be 100 percent reflecting to 1.06 microns and partially reflecting to 1.5 microns. The Raman resonant cavity is aligned along the optical path of a giant pulse source.

The Q-switched giant pulse source at 1.06 microns comprises laser rod 20 which is a source of 1.06 micron radiation, flash lamp 21, Q-switching dye 23 housed in cell 22, and reflector 26. Laser 20 is a solid state laser rod surrounded by optical pumping means in the form of flash lamp 21 powered from a switchable light pump source not shown. Laser 20 may be any source of 1.06 microns. In the preferred embodiments laser 20 comprises either $Nd^{+3}$-glass or Nd-YAG. Flash lamp 21 is a conventional Xenon lamp. Regenerative means in the form of end coating 16 and reflector 26 are provided to define an optical resonant cavity for laser 20. Reflector 26 is substantially 100 percent reflective at 1.06 microns. End coating 16 is partially transmissive to 1.06 microns.

An optical control means is provided in the form of cell 22 containing a saturable absorber dye 23. Dye 23 is selected from the class of bivalent transition metal dithiene complexes having a square planar structure. The particular species of this class which has been found to exhibit saturable absorber characteristics at 1.06 microns has the following general formula:

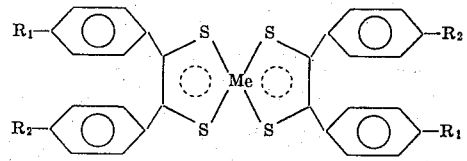

in which $R_1$ is a hydrogen atom and $R_2$ may be either a hydrogen atom or $(CH_3)_2N$. Alternatively, $R_1$ and $R_2$ are $CH_3O$. Me is the metal, preferably nickel or platinum.

In the preferred embodiment dye 23 is bis-[4-dimethylaminodithiobenzil]-nickel dissolved in 1,2 dichloroethane. As discussed in the related application of Drexhage, et al., the peak absorption of light by these complexes is very close to 1.06 microns, which is the wavelength of light emitted by the laser rod 20.

In operation, laser rod 20 is excited by flash lamp 21, initiating laser action at 1.06 microns. However, this action is inhibited by dye 23 because of the high absorption of the dye at 1.06 microns in the absence of a sufficient amount of incident light from laser 20. This initial opacity spoils the Q of the optical cavity defined by reflectors 16 and 26. By continuously exciting laser 20, however, sufficient laser energy will be generated to excite the molecules in dye 23 so that it starts to become transparent. This, in turn, improves the Q of the cavity resulting in more laser light. This regenerative process results in the dye becoming completely transparent in a very short interval and a giant pulse of radiation at 1.06 microns is released with a very narrow spectral bandwidth. This energetic pulse passes through concave, dichroic reflector 12, which, it will be recalled, is transparent to 1.06 microns. This pulse is focused to a point within Raman-active medium 10 and induces gain in the Raman medium 10 at a Stokes frequency $\gamma_p - \gamma_{shift}$, in this case 1.5 microns. The Stokes radiation stimulated by the giant pulse grows in amplitude, overcoming the losses within the cavity defined by reflectors 12 and 14. The radiation at 1.5 microns will travel to either reflector 12 or 14 where it will be reflected back into the Raman medium 10 with further increase in amplitude. The gain in energy of the Stokes wave during repeated passes compensates for losses and a steady wave will build up. Each time the wave impinges reflector 14, a portion of the wave passes through it depending on its transmissivity. This portion is continually reinforced because of repeated reflections and, thus reinforced, constitutes the output Stokes radiation at 1.5 microns. Any radiation from the giant pulse which is not converted into Raman radiation after passing through Raman cell 11 is focused within the cell by being reflected from and refocused by reflector 12.

It will be readily apparent that the Raman medium need not be enclosed in cell 11 within the optical cavity formed by reflectors 12 and 14. Instead, the entire system could be enveloped in a cloud of the gas forming the Raman medium. This latter technique may be more economical and less difficult to maintain under field conditions. It will also be obvious to those of skill in the art that reflectors 12 and 14 might be replaced by flat mirrors and separate focusing lenses.

In a preferred embodiment of the apparatus shown in FIG. 1, a $Nd^{+3}$-glass rod is used as laser 20 and $CH_4$ gas is used as Raman medium 10. Saturable absorber dye 23 is a $10^{-6}$ molar solution of bis-[4-dimethylaminodithiobenzil]-nickel dissolved in 1,2 dichloroethane.

Figure 3:
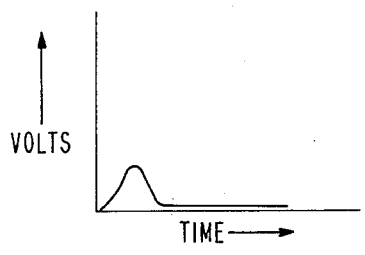
FIG. 3 is a temporal profile of the characteristics of a giant pulse produced when using $Nd^{+3}$-glass as the laser rod and bis-[4-dimethylaminodithiobenzil]-nickel as the saturable absorber Q-switch.

FIG. 3 is a showing of a typical output giant pulse of the apparatus. The pulse is 10 nanoseconds wide at half-maximum. The total energy of the pulse is approximately 1.72 joules yielding a measured power output of 85 MW. The input power from flash lamps 21 is 12 MW, requiring a conservatively designed power supply of 300 joules.

Figure 4:
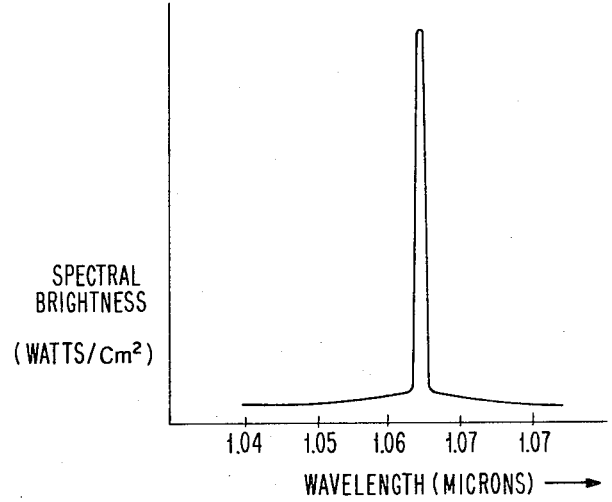
FIG. 4 is a temporal profile of the characteristics of a Raman pulse at 1.5 microns when using $CH_4$ as the Raman medium.

FIG. 4 is a plot of a spectrometer measurement of the spectral brightness versus wavelength of the giant pulse emitted from the giant pulse source. It will be seen that the curve peaks very sharply at 1.0641 microns. Without the dye, the spectral output of $Nd^{+3}$-glass is much broader and could not be used to stimulate Raman emission from $CH_4$. This is the case even though the power output of 85 MW is well above 50 MW, the power theoretically calculated to be the threshold required to stimulate Raman emission from $CH_4$.

Figure 5:
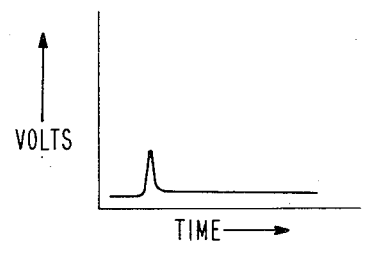
FIG. 5 is a graphical representation of the spectral brightness vs. wavelength of the giant pulse produced when using $Nd^{+3}$-glass as the laser rod and bis-[4-dimethylaminodithiobenzil]-nickel as the saturable absorber Q-switch.

In FIG. 5 there is shown a typical output Raman pulse stimulated from Raman medium 10 by the Q-switched pulse. The pulse is approximately 10 nanoseconds wide and has an energy of 100 millijoules at 1.54 microns.

In a second embodiment of the apparatus shown in FIG. 1, a Nd-YAG rod is used as laser 20. $CH_4$ gas is used as Raman medium 10 and dye 23 is bis-[4-dimethylaminodithiobenzil]-nickel. High energy raman emission at 1.54 microns is achieved from the system. The input power from flash lamp 21 required to produce a giant pulse at 1.06 microns is 50 joules.

Figure 2:
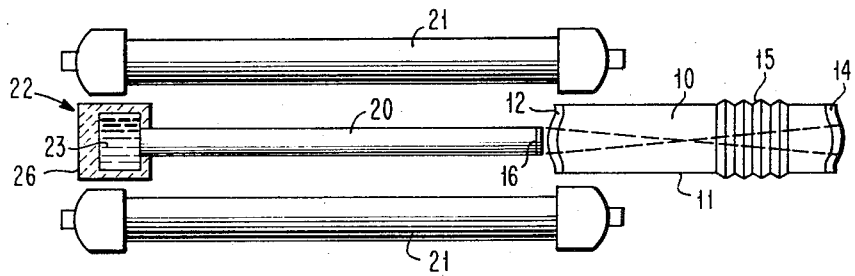
FIG. 2 illustrates a schematic embodiment of a compact "eye-safe" laser system according to the principles of the subject invention.

To achieve the compact Raman laser of minimum weight and size shown in FIG. 2, the threshold and efficiency of the laser must be optimized. Minimum threshold and maximum efficiency are obtained when the Raman cell is placed in a concentric cavity which is dynamically coupled to the laser rod cavity. A quantitative description of such a system is possible only empirically. An approximate solution to the ideal system is to consider the Raman cavity to be concentric and the laser pump pulse to be a traveling wave which is focused into the mode waist of the cavity. The solution indicates that minimum threshold is achieved for the cavity with the smallest mode waist, implying that the laser pump should be focused to the smallest diameter possible. A limitation on the focal diameter of the pump laser is imposed by the occurrence of laser-induced spark breakdown in the high intensity region of the focus of the Raman cavity. It has been found that for the pump brightness and $CH_4$ pressures in the region of interest, spark breakdown does not occur in a 5-centimeter concentric cavity. Hence, the cavity length for the ideal system is five centimeters or less.

The ring time of the cavity should be at least comparable to the pulse duration of the Q-switch pump pulse, that is, on the order of 10 nanoseconds in order that the Raman-Stokes signal will undergo a standing wave growth. The photon lifetime of a cavity is given by the well known formula:

$$t_p = L/c(1-R)$$

where $t_p$ is the photon lifetime within the cavity, $L$ is the cavity length, $c$ is the speed of light, and $R$ is the square root of the product of the reflectivities at 1.54 microns. The desired ring time of 10 nanoseconds with a length of 5 cm. yields a reflectivity of 98.4 percent.

It will be realized that other designs are possible. The preferred embodiment described in detail is a system of minimum size and weight. However, the invention is also applicable to conditions where these criteria are not of the highest importance. In these situations, the cavity length of the Raman cell, the focal length of the focusing elements and the reflectivity in the cavity may be altered considerably while retaining a useful output. These variations can be made by those of skill in the art using standard techniques. In addition, as pointed out in the related copending application of Drexhage, et al., the dye can be dissolved in solutions other than dichloroethane.

While the invention has been particularly shown and described with reference to a preferred embodiment thereof, it will be understood by those skilled in the art that various changes in form and detail may be made therein without departing from the spirit of the invention. For example, the cavity lengths of the giant pulse source and of the Raman cell as well as the transmissivity of the absorber dye may be varied to achieve useful output pulses having different characteristics from those described.

What is claimed is:

1. A Raman laser which emits radiation at 1.5 microns comprising:
   a Q-switched laser for emitting giant pulses at 1.06 microns comprising:
      a source of laser radiation at 1.06 microns disposed within a first resonant cavity, one end of the cavity being partially transmitting;
      pumping means coupled to the 1.06-micron laser source for exciting the source;
      a solution of a bivalent transition metal dithiene complex with a square planar structure having saturable absorber characteristics at 1.06 microns to Q-switch the source of laser radiation, thereby causing giant pulses to be emitted from the first resonant cavity;
   a second resonant cavity optically coupled to the partially transmitting end of the Q-switched laser; and
   a Raman-active medium having a frequency shift of around 3,000 $cm^{-1}$ disposed within the second cavity, and stimulated by the pulses from the Q-switched laser to emit pulses at 1.05 microns.

2. The apparatus of claim 1 wherein the Raman active medium is methane.

3. The apparatus of claim 1 wherein the Raman active medium is deuterium.

4. The apparatus of claim 1 wherein the laser source of 1.06 microns is a Nd+3-glass rod.

5. The apparatus of claim 1 wherein the laser source of 1.06 microns is a Nd-YAG rod.

6. The apparatus of claim 1 wherein the dithiene complex has the following general formula:

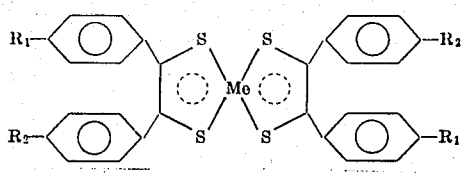

wherein $R_1$ and $R_2$ represent $CH_3O$ and Me is a bivalent transition metal.

7. The apparatus of claim 6 wherein the transition metal is selected from the group consisting of nickel and platinum.

8. The apparatus of claim 1 wherein the dithiene complex has the following general formula:

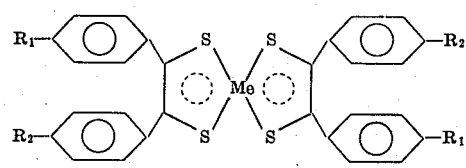

wherein $R_1$ represents a hydrogen atom, $R_2$ is a substituent selected from the group consisting of a hydrogen atom and $(CH_3)_2N$, and Me is a bivalent transition metal.

9. The apparatus of claim 8 wherein the transition metal is selected from the group consisting of nickel and platinum.

10. The apparatus of claim 9 wherein the dithiene complex is bis-[4-dimethylaminodithiobenzil]-nickel.

11. A compact Raman laser which emits radiation at 1.5 microns comprising:
a source of laser radiation at 1.06 microns disposed within a first resonant cavity, one end of the cavity being partially transmitting, for emitting giant pulses;
a solution of bis-[4-dimethylaminodithiobenzil]-nickel for Q-switching the source of laser radiation;
pumping means coupled to the 1.06-micron source for exciting the source;
a concentric resonant cavity formed by a pair of concave reflectors aligned along the optical path of the first resonant cavity, the length of the concentric resonant cavity, being less than around 5 cm, the square root of the product of the reflectivities, R, at 1.5 microns of the concave reflectors being determined by the relationship:

$$t_p = L/c(1-R)$$

where $t_p$ is the photon lifetime within the concentric resonant cavity,
$L$ is the length of the concentric resonant cavity, and
$c$ is the speed of light; and
a Raman-active medium comprising methane gas disposed within the concentric resonant cavity, the methane being stimulated to emit pulses of radiation at 1.54 microns by the giant pulses.

12. A compact Raman laser as in claim 11 wherein the source of 1.06 microns is a Nd+3-glass rod.

13. A compact Raman laser as in claim 11 wherein the source of 1.06 microns is a Nd-YAG rod.

* * * * *